May 30, 1961 D. M. WILLYOUNG ET AL 2,986,664
DIAGONAL FLOW DIRECT-COOLED DYNAMOELECTRIC MACHINE ROTOR
Filed Nov. 23, 1959 2 Sheets-Sheet 1
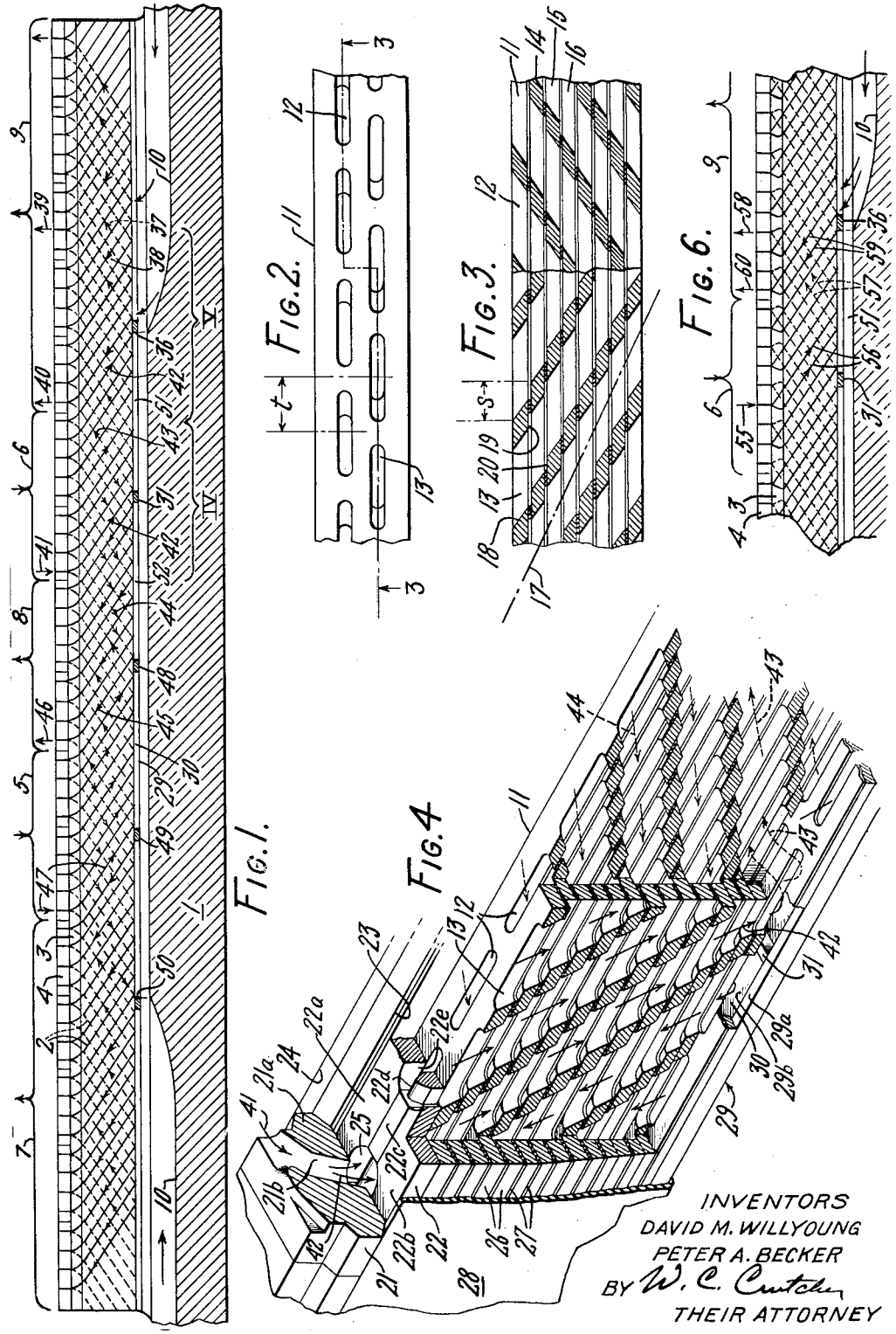
INVENTORS
DAVID M. WILLYOUNG
PETER A. BECKER
BY *W. C. Crutcher*
THEIR ATTORNEY

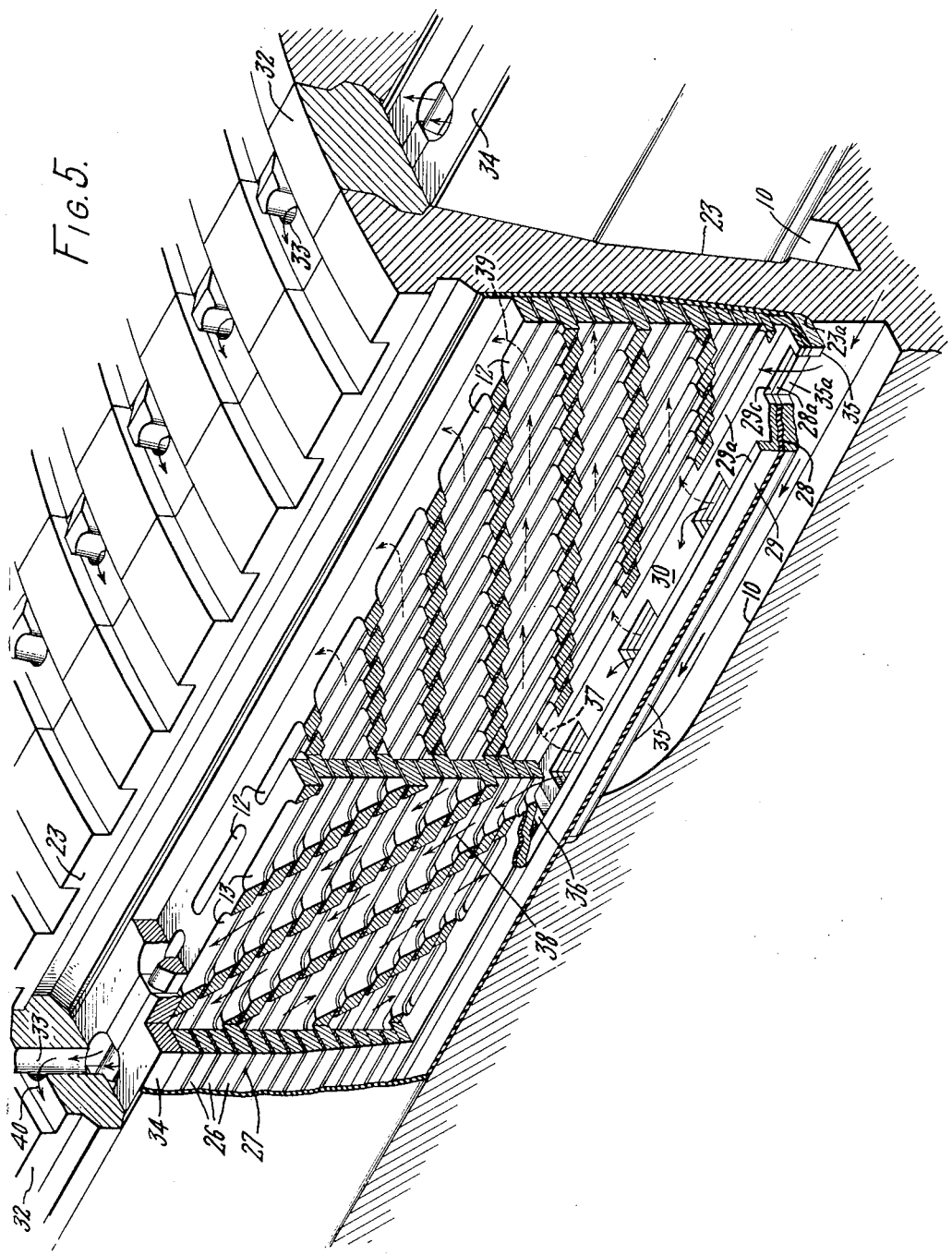

United States Patent Office 2,986,664
Patented May 30, 1961

2,986,664
DIAGONAL FLOW DIRECT-COOLED DYNAMO-ELECTRIC MACHINE ROTOR

David M. Willyoung and Peter A. Becker, Scotia, N.Y., assignors to General Electric Company, a corporation of New York Filed Nov. 23, 1959, Ser. No. 854,855

8 Claims. (Cl. 310—61)

This invention relates to an improved cooling arrangement for the windings of a dynamoelectric machine rotor, and more particularly it relates to an arrangement employing an improved "direct-cooled" conductor strand suitable for producing diagonal flow of the coolant within the rotor winding slots with a special arrangement for cooling the rotor body end portions.

The capacity of a large dynamoelectric machine, such as a large turbine-generator, may be increased by cooling the windings. Large generators customarily employ a stationary armature which is wound to provide alternating current when excitation is provided by a central rotor carrying a field winding. The generator output may be increased by increasing the rotor excitation current, provided that the armature and field windings and other critical parts of the generator are adequately cooled. Due to the fact that the rotor is turning at a high speed, a gas is usually used to remove heat from the windings.

Various constructions have heretofore been utilized to cool the rotor windings. One type of construction utilizes "direct-cooled" conductors in which cooling gas is circulated through the rotor windings in direct contact with exposed portions of the conductors. The cooling gas may be supplied by the "fully end-ventilated" arrangement in which the gas is introduced into passages at the ends of the rotor body and forced axially therethrough to be discharged in the "air gap" at the center of the rotor. For long rotor bodies, however, this type of gas feed is subject to practical limits due to excessively high fan pressures and heat concentration in the center portion of the rotor.

In order to avoid these problems, the "gap pickup" principle has been employed to a large extent. This arrangement is more fully described in U.S. Patent No. 2,702,870, issued to Rollin H. Norris on February 22, 1955, and assigned to the assignee of the present application. This arrangement contemplates alternate pickup and discharge zones in the air gap between the rotor and the stator. Suitably placed holes either in the slot wedges or the rotor teeth around the rotor periphery conduct the cooling gas generally radially inward into the winding slot to pass through suitable conduits in contact with the conductor copper. This method of feeding coolant from the gap is preferable in many ways, in that it does not require large compressors or high gas pressures in the casing to cause a sufficient mass flow of gas to circulate, and it produces a more uniform temperature distribution along the length of the rotor. At the same time it is subject to problems of efficient recovery of the velocity of the gas in the air gap relative to the rotor, efficient conversion of this impact velocity head into differential pressure suitable for forcing the cooling gas through the conductor cooling passages, and proper distribution of the cooling fluid among the conductors to insure that localized overheating does not occur.

Various shapes of conductors have been used in order to facilitate feeding the coolant gas to the conductors and to move the gas both axially and transversely along the conductors from its point of entry to its point of discharge. One commonly used conductor is fabricated in two sections. One section is an extruded shape designed to provide radial ribs while the other section bridges the space between the ribs to provide a series of longitudinal passages between the bare strands. The extruded ribs must be removed by machining at points of entrance or discharge of the coolant to the conductor to provide for cross-feed to or from the longitudinal passages. Entry into the conductors at these points is generally from radial chambers formed by cutting away sections of the superposed conductors at the side of the slot.

Other arrangements include conductors having longitudinal grooves in the conductor side as more specifically disclosed in U.S. Patent No. 2,661,434 issued December 1, 1953, to C. E. Kilbourne or extra corrugated side plates attached to the laminated conductor stack as more specifically disclosed in U.S. Patent No. 2,664,512 issued December 29, 1953, to E. D. Huntley. Another arrangement is disclosed in U.S. Patent No. 2,791,707 issued to D. M. Willyoung on May 7, 1957, in which a corrugated grid is disposed between laminations in the winding stack to carry the cooling fluid longitudinally along the rotor. All of the above-cited patents are assigned to the assignee of the present application.

Reference to the above conductor cooling forms will illustrate that they are designed to provide for longitudinal transport of the cooling gas between points of entry and discharge and that generally they utilize side entry passages machined in the edges of the superposed conductors in order to allow the cooling gas to pass to the proper radial position before it turns at a right angle to gain access to the longitudinal flow passages. The side entry passages are fed, in turn, through holes in the ground insulation, which in turn connect with corresponding holes in the rotor teeth and wedges. Inasmuch as the windings must, in every case, be electrically insulated from the rotor metal by heavy ground insulation, any opening in the ground insulation reduces both its mechanical and dielectric strength, and since it is not fully supported laterally at these points, the ground insulation must itself be made sufficiently stiff to prevent buckling into the side entry passage. Also, entry from the side of the slot into the conductors contained therein, in many cases, requires machining passages in the rotor tooth itself which, in the case of a massive forging such as employed in present day generator rotors is both difficult and costly.

Also, many of the described arrangements utilize either special additional grids or, in the case of extruded sections, require special extruded shapes which are generally more expensive than commercially obtainable copper conductor strands having a standard rectangular cross-section. Considerable cost is then involved in machining the required side and cross passages to properly connect the flow passages.

A further characteristic of all the above described internally-cooled-conductor-gap-pickup arrangements is that the flow from any one pickup hole is ducted to one or more particular conductors and influences the temperature of the other conductors only by such heat transfer as occurs by conduction to adjacent layers through the strand insulation, or which occurs in the side passages machined in the superposed conductor stack. To minimize the possible local "hot spot" that might occur if one gap-pickup hole for some reason or another did not scoop up its proper share of cooling gas, or which might occur if one of the cooling passages happened to become restricted by a foreign object, very complex flow patterns have been utilized as described, for example, in AIEE paper #55-53, Gap-Pickup Ventilation of Turbine Generator Fields, AIEE Transactions III, June 1956, in order to promote the "thermal coupling" between cooling flow streams supplied by different inlet holes.

A Russian publication, "A Turbo-Generator Rotor with Directly Cooled Winding Conductors" by V. V. Titov published January 18, 1957, and described at the IEC Moscow meeting in June 1957, describes a gap-pickup rotor with a generally diagonal flow pattern. Cooling slots are milled along the outside edges of the strands. Entry of the coolant at the end of the rotor is through hollow conductors formed by welding U-bars and the end turns are subsequently welded to the slot portions of the strands. Extreme difficulty was apparently experienced in piecing together and fitting the turns in the slots in order to provide a suitable structure for cooling the end portion of the rotor. This arrangement again leaves the ground insulation unsupported opposite the flow passages with potential buckling hazards, and in addition exposes only a small surface area of copper on the sides of the strands to the cooling gas resulting in a high temperature difference between copper and cooling fluid.

Accordingly, one object of the present invention is to provide a simplified conductor-cooled rotor winding for a dynamoelectric machine utilizing an improved flow pattern of the cooling gas.

Another object is to provide an improved direct-cooled conductor for a rotor field winding which is economical to produce and which provides for a large heat transfer area between the copper and the cooling fluid.

Another object is to furnish a winding arrangement for direct-cooled conductors, which reduces abrupt changes of direction in the coolant, thus promoting efficient recovery from gas velocity to gas pressure.

Another object of the invention is to provide an improved method for furnishing coolant conduits in the end portions of a dynamoelectric machine rotor.

Still another object is to provide a simplified arrangement for utilizing direct-cooled conductors in the winding slots of a generator rotor, which provides a high utilization of the available winding slot area and which provides for radial entry and discharge of the cooling gas in the air gap.

Still another object is to provide a simplified rotor for a large generator which requires less machining for cooling conduits than a conventional rotor.

Another important object is to furnish a direct-cooled winding for a rotor wherein the ground insulation requires no side-entry holes which would reduce its mechanical or dielectric strength.

Another object is to provide a direct-cooled rotor winding arrangement providing for substantially uniform temperature distribution throughout and minimizing the effects of variations in pickup performance of various pickup holes.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

Fig. 1 is a section taken through a winding slot of the rotor body but omitting many structural details in order to schematically illustrate the coolant flow pattern;

Fig. 2 is a plan view of a segment of a conductor strand according to the invention;

Fig. 3 is a horizontal view, partly in section, of a typical stack of conductor strands, as viewed along lines 3—3 of Fig. 2;

Fig. 4 is a perspective view, partly in section, of the bracketed portion of the rotor indicated by numeral IV in Fig. 1;

Fig. 5 is a perspective view partly in section, of the bracketed portion of the rotor indicated by numeral V in Fig. 1; and Fig. 6 illustrates a modification of the coolant flow pattern shown in Fig. 1.

Generally stated, the invention is practiced by providing a winding utilizing conductor strands of generally rectangular cross-section with a double row of elongated slots punched in the strand along the slot portion of the conductor. Each row of slots in each strand is slightly offset from the row of slots in the adjacent strands above and below so that the slots define a number of diagonal flow passages for the coolant. Additionally, the row of slots on one side of the conductor strand is displaced with respect to the other row of slots so that one row "moves" with respect to the other row from one strand to the next. In this manner, the diagonal coolant passages on one side of the strand will slant in an opposite direction from those on the other side of the strand. Thus, when a number of strands are super-imposed, a series of "criss-crossed" diagonal cooling passages is furnished which transport the coolant longitudinally as well as radially through all of the conductor layers. A special chamber at the bottom of the slot provides for reversal of coolant flow from a diagonally inward direction to a diagonally outward direction.

Referring now to Fig. 1 of the drawing, a diagrammatic view through the winding slot in the central body portion 1 of a generator rotor is illustrated. The spindle portions of the rotor are not shown. The coolant flows through direct cooling ducts indicated schematically at 2, through a layer of "creepage blocks" 3 and a layer of slot wedges 4 to and from the "air gap" between the rotor periphery and the stator bore. The stator is not shown in the drawing, but it will of course be understood that the stator is suitably arranged to accommodate the rotor in a central bore and to supply a radially inward flow of coolant in the "gap pickup" zones indicated by brackets 5, 6, for instance, in the manner described in the aforementioned Norris patent. Similarly, gap discharge zones indicated by brackets 7, 8, 9 are zones where the coolant is flowing radially outward to be received by suitable exhaust ducts formed in the strator bore. Sub-slots 10 extend below the winding slots 2 for a portion of the rotor length in order to feed coolant gas from the ends of the rotor. The end flow may be produced by fans (not shown) mounted on the rotor or by the self-pumping centrifugal action of the rotor itself in a manner which will be understood by those skilled in the art. The structure for supplying and receiving cooling gas to and from the rotor utilizing both the gap pickup method and the end feed through sub-slots 10 is essentially conventional and forms no part of the present invention.

Referring now to Fig. 2 of the drawing, a plan view of a conductor strand segment 11 reveals it to be punched with a first row of slots 12 and a second row of slots 13. Reference to Fig. 3 of the drawing illustrates a typical horizontal section showing a number of additional strands 14, 15, 16 underlying strand 11.

The strands 11, 14, 15, 16, etc., have rectangular cross-sections and slots 12, 13 in each strand are formed by a simple punch press operation, although they could also be machined. The simplicity of the structure causes it to lend itself to multiple die or automatic feed punching operations.

It is to be noted that slots 12, 13 are punched at an angle rather than perpendicular to the strand surface. This is done in order to increase the cross-sectional area of the conduits defined by the slots, although this slanted punching is not absolutely necessary. It will be appreciated that, since each strand is offset from the next, perpendicular punching leaves a projecting edge that serves to constrict the passageway somewhat, depending on the strand thickness. Slots 12 are punched angularly toward the left, as viewed in Figs. 2 and 3, with slots 13 being angled toward the right.

It will also be noted that the longitudinal spacing between each slot 13 is the same for strand 14 as it is for strand 11, but that strand 14 has been shifted longitudinally in the slot by an amount indicated by the spacing "s" in Fig. 3. In the embodiment shown, each strand 14, 15, 16 is displaced by the same spacing "s" from the strands above and below it, although it is not necessary that the amount of shift be uniform in order to practice the invention. Thus it will be seen that the slots 13 will define a cooling conduit slanted with respect to the rotor axis, the centerline of the cooling conduit being indicated at 17. It may be noted at this point that the degree of slant at the ends of slot 13, as shown at 18 need not necessarily correspond with the degree of slant of the conduit centerline 17. Thus the edges 19, 20 of the strands will jut into the cooling conduit to provide turbulence and to expose additional area for promoting heat transfer from the conductor strands to the cooling gas.

The longitudinal spacing between a given slot 12 on one side of the conductor and a slot 13 on the other side is shown as "t" in Fig. 2. Spacing "t" changes from one strand to the next, which means that one row of slots will "move" relative to the other row of slots from each strand to the next. In order to provide a symmetrical flow pattern, with the conduits defined by slots 12 slanting at the same angle to the rotor axis as the conduits defined by slots 13 but in an opposite axial sense, the change in the spacing "t" from one strand to the next must equal twice the amount of offset "s." Although many other arrangements and spacings might be appropriate for other cooling patterns, in the embodiment shown, the above-described plan of slot programming is followed.

Referring now to Fig. 4 of the drawing, a slot wedge 21 and a "creepage block" cooperate to hold the winding in a rotor winding slot 23. As will be appreciated by those skilled in the art, wedge 21 prevents radial displacement of the windings by means of dovetail portions 21a disposed in suitable longitudinal slots 24 cut in the side of slot 23. Wedge 21 incorporates a series of "gap pickup" holes 21b which pick up cooling gas from the "air gap" and discharge is radially inward.

Creepage block 22 consists of a multi-piece structure in the embodiment shown, although it could also be made in one piece. Creepage block 22 is constructed from an insulating material such as a polyester glass laminate. Right and left side pieces 22a, 22b, together with a central divider piece 22c, define a central top opening 25. Opening 25 is arranged to register with the lower end of conduit 21b in slot wedge 21. The creepage block center piece 22c also incorporates a flow divider portion 22d which divides the coolant flow into two portions. Two elongated openings 22e are defined on the lower side of creepage block 22 by the divider 22c and the right and left side pieces 22a, 22b. Thus the creepage block acts as a "transition" member which receives the coolant flow in the central hole 25, divides it into two portions to discharge it from elongated openings 22e which are located to register with slots 12, 13 in the conductors.

The field winding consists of stacked conductor strands 26 which are separated from one another by relatively light strand insulation 27 and insulated from the walls of the rotor slot 23 by heavy ground insulation 28. The conductors have slots 12, 13 formed in a manner described in connection with Figs. 2 and 3 which form diagonal cooling passages. The slots 12, 13 of the top conductor bar are arranged to register with the elongated lower openings 22e in the bottom of the creepage blocks. The strands 26 are supported at the bottom of the slot 23 by a channel member 29 having outwardly projecting spaced radial flanges 29a on either side of the slot. This leaves a radial clearance gap 30 between the bottom strand and the web 29b of the channel 29. Thus the gas can flow transversely across the slot in this clearance gap 30 and communication is thus afforded between the conduits defined by slots 12 and the conduits defined by slots 13. At specific points along the rotor length, this clearance space 30 is divided into zones by barrier pieces such as the one indicated at 31. The barrier piece 31 prevents longitudinal communication between the different zones in the clearance space 30. For efficient use of available space, the channel member 29 is preferably an active electrical conductor, and either alone or cooperating with one or more laminations directly above it ordinarily forms the bottom conductor in the coil.

Referring now to Fig. 5 of the drawing, the bracketed portion of the rotor illustrated by numeral V in Fig. 1 is shown. There, slot wedges 32 incorporate gap discharge conduits 33, which are formed slightly differently from the previously discussed gap pickup conduits in that they are aerodynamically designed to discharge the cooling gas rather than to receive it. The wedges 32 hold creepage blocks 34 in position which may be formed exactly like the previously discussed creepage blocks 22 in Fig. 4. Wedges 32 and creepage blocks 34 retain strands 26 in the slot 23 as before.

Channel member 29, which supports the windings 26, requires an additional support block 35, which rests on shoulders 23a cut in the sides of the slot. Support block 35 is only utilized where the additional support is required over the sub-slot 10.

Longitudinally spaced openings 29c, 28a, 35a are provided in channel member 29, ground insulation 28 and support piece 35 respectively. Thus gas entering longitudinally through the sub-slot 10 may pass radially outward through the openings 29c, 28a, 35a to enter the clearance space 30 between the bottom conductor and the web of channel 29. A barrier piece 36 is shown blocking off the free passage of gas longitudinally through space 30.

Fig. 6 illustrates a modification of the coolant flow pattern shown in Fig. 1. There portions of the intake zone 6 and the discharge zone 9 are shown, which correspond with the zones shown in Fig. 1. The dashed lines represent the flow paths through conduits defined by slots 12 on the far side of the strands and the solid lines represent flow through slots 13 on the near side of the strands.

By comparison with Fig. 1, it will be seen that in Fig. 6 the layer of creepage blocks 3' incorporates transition ducts which combine the flow from two adjacent conduits on the same side of the strand, rather than on opposite sides of the strand as in Fig. 1. The combined flow enters or discharges through conduits in the layer of slot wedges 4, the same as in Fig. 1. Thus two parallel flow paths diagonally down one side of the strand and diagonally up the other side are obtained.

The construction of Fig. 6 may be used where it is undesirable to combine two flows of fluid emanating from two different sources, where the two supply pressures or the resistance of the flow paths is appreciably different. This will reduce the tendency for the stronger flow to block the weaker flow at the common outlet. The design of a suitable creepage block incorporating transition passages as diagrammatically shown in layer 3' of Fig. 6 will be readily apparent to one skilled in the art.

The operation of the improved cooling arrangement will now be described. Referring to Fig. 1, the convention adopted for purposes of description is that the gas flow through slots 12 on the far side of the conductor is shown as dashed arrows whether the flow is inward or outward, while the flow through slots 13 on the near side of the strand is shown by solid arrows. This convention is carried through in the detailed perspective views of Figs. 4 and 5 and the numbered arrows also correspond.

Looking now at Figs. 1 and 5 together, all of the gas entering longitudinally through the sub-slot 10 is discharged into the rotor gap discharge zone indicated by bracket 9 (Fig. 1). The coolant enters sub-slot 10 as indicated by the arrows and, after passing through openings 29c, 28a, 35a, it flows radially outward through passages defined by slots 12 as indicated by the dotted arrows 37 and radially outward in the other direction through passages defined by slots 13, as indicated by arrows 38. The coolant then is discharged into the air gap as illustrated by arrows 39, 40 after passing through the creepage block 34 and the gap discharge conduits 33 in wedge 32. The barrier piece 36 prevents the longitudinal flow of gas beyond the end of sub-slot 10. It will be thus appreciated that in the portion of the windings just described, the flow is radially outward on both sides of the conductor strand.

In addition to the axial feed of cooling gas through the sub-slot 10 as indicated by the arrows, gas is also fed inward from the gap pickup zone indicated by bracket 6. The gas picked up from this zone discharges both into the zone indicated by bracket 8 and to the zone indicated by bracket 9 and the description will be made more clear by reference to Fig. 4 of the drawing, taken together with Fig. 1. There, the gas enters as indicated by arrow 41 and divides into two portions. The first portion flows diagonally downward toward the rotor end in the passages defined by slots 13, as indicated by arrows 42. The gas flows transversely across the bottom of the slot in the space provided by the channel member 29 to reverse direction and flows outwardly on the opposite side of the conductor through the passages defined by slots 12 as indicated by the dotted arrow 43. In the embodiment shown, this first portion of the gas continues upward to empty into the creepage block 34 and to discharge into the gap as indicated by arrow 40 from the same discharge hole as gas which is fed from the sub-slot 10.

The second portion of gas entering from the pickup zone 6 indicated by arrow 41 flows diagonally downward toward the center of the rotor through the passages defined by slots 12 as indicated by the dotted arrows 44. It flows transversely across the bottom of the slot in chamber 30 to flow diagonally outward through passages defined by slots 13 as indicated by the arrow 45 on the near side of the slot. This portion of the gas discharges into zone 8 as indicated by arrow 46. It is joined there by gas from gap pickup zone 5 which follows the path indicated by arrows 47 in a similar manner.

Additional barrier pieces 48, 49, 50 divide the cross-flow passage 30 into longitudinal zones. These zones represent slot cross-flow which alternates in direction from one zone to the next. Thus looking at Fig. 1, a zone 51 represents a cross-flow into the plane of the drawing and the zone 52 represents a cross-flow outward from the plane of the drawing.

The operation of the modification shown by Fig. 6 should be apparent from the drawing. Briefly, cooling gas enters from intake zone 6 as shown by the arrow 55, where it divides into two portions indicated by arrows 56 and flows diagonally downward on the near side of the strand. The gas then flows across the slot in passage 51 and upward on the far side of the strand as indicated by arrows 57 to recombine and discharge into the zone 9 as shown by arrow 58. Gas entering from sub-slot 10 flows upward on the near side of the slot as shown by arrows 59 and combine to discharge into zone 9 as shown by arrow 60.

With this arrangement, two parallel flow paths are supplied at substantially equal pressures, hence the flow in one path will not tend to block that in the other path when the flows recombine.

In conclusion, it will be seen that the diagonal flow pattern allows for axially spaced inlet and outlet zones 5, 6, 7, 8, 9 along the air gap with a convenient means for receiving the gas in one zone and discharging it into another zone. Thus the flow will be down one side of the conductor bar and up the other side of the bar in the portion of the rotor indicated by Fig. 4; it will be upward on both sides of the bar in the portion of the rotor indicated by Fig. 5. For longer rotors it may be desirable to utilize additional inlet-outlet sections along the rotor length, and it is evident that this may be done by merely repeating the flow passage pattern illustrated in the center section of Fig. 1. For example, instead of dividing the rotor into flow sections denoted by 7, 5, 8, 6, 9 respectively as shown in Fig. 1, additional sections might be added so that the pattern would employ in order sections 7, 5, 8, 5, 8, 6, 9 or 7, 5, 8, 5, 8, 5, 8, 6, 9, etc.

In addition to the obvious economy achieved by using commercially obtainable copper conductors of generally rectangular cross-section which require only a repetitive punching operation to form the cooling passages, the benefits resulting from the simple flow pattern afforded by the staggered punched openings are many.

A high degree of uniformity of temperature is achieved by the arrangement for the following reasons. Since the diagonal flow streams on one side of the strand cross the flow streams on the other side of the strand, there is a tendency to equalize temperatures throughout the winding.

It can be shown analytically that if the gas temperature alone is considered, about 50% of the winding volume is substantially at the average gas temperature, with the greatest uniformity toward the bottom of the slot, which is usually difficult to cool properly. Although an analysis of the theoretical gas temperature would show broad longitudinally spaced zones centered at the gap inlet and gap discharge zones which are at higher-than-average or lower-than-average temperatures, a further consideration of the excellent conductive ability of copper longitudinally along the strand will show that the temperatures of these broad areas are substantially equalized.

Since the gas is fed radially into the conductor bar through the slot wedge, and does not require side entry into the strands from the slot, uniform support of the ground insulation 28 is afforded throughout the length of the slot 23. Also, expensive, difficult-to-fabricate cooling ducts in the rotor teeth are unnecessary. Thus the teeth, which receive the full load of the windings due to centrifugal force on the windings need not have holes or slots, which would give rise to undesirable stress concentration and remove load-carrying material.

Tests have shown that this system as a whole is more effective in converting the velocity energy of the gas drawn in from the air gap to differential pressure suitable for circulating the gas through the flow passages than when longitudinal ducts are provided. This is because the gas is not forced to make abrupt turns, since the creepage block can be shaped to provide a gentle transition passage, and the high velocity gas entering the inlet hole can be effectively diffused in the diagonal passage passing through the conductor stack.

It will be noted that by utilizing a double row of elongated slots passing through the copper more or less the same amount of heat transfer surface area is exposed to cooling gas per unit length of conductor as is utilized in previous designs employing longitudinal passages along the conductor. Thus with two rows of slots passing through the conductors, the same order of temperature rise of conductor over cooling gas on the average will be found, depending of course on such differences in heat transfer coefficient, flow velocity and electrical loss intensity as may occur.

Modifications of the arrangement and location of the punched holes in the conductors will occur to those skilled in the art. For example, although a double row of punched holes is presently felt to be the preferable arrangement, it may be found that three, or more, rows of slots across the conductor width, exposing more heat transfer area, would achieve desirable advantages in some cases.

Although the conductor strands shown have utilized "angle punching" in order not to reduce the cross-sectional area of the cooling passages, it will be appreciated that, by using more conductor strands of smaller radial thickness, holes punched normal to the conductor strand may be employed possibly resulting in lower cost. Also greater flexibility in punching arrangements would be afforded with such perpendicular slots, since fewer patterns might be necessary. This is because a strand which is punched for one position might be turned end-for-end to double as a strand designed for another radial location in the slot. Several strands, of course, could be grouped in parallel electrically and operated as a single conductor, so that this would in no way restrict or alter the voltage supplied by the exciter.

It is also within the scope of the invention to reverse the flow at the top of the slot, as well as at the bottom of the slot, so that the gas is passed radially back and forth along the slot length for several trips before it is finally discharged into the air gap.

While there has been described what is at present considered to be the preferred embodiment of the punched conductor diagonal flow direct-cooled rotor, it will be understood that various modifications may be made therein, and it is intended to cover in the appended claims all such modifications as fall within the scope of this invention.

What we claim as new and desire to secure by Letters Patent of the United States is:

1. A direct-cooled dynamoelectric machine rotor comprising a rotor body defining a plurality of circumferentially spaced axial slots, a plurality of conductor strands disposed in stacked relationship in said slots, each of said conductor strands defining a longitudinal row of axially spaced prepunched holes extending through the radial thickness of the strand, each strand being axially displaced with respect to the adjacent overlying and underlying strands, whereby the strand holes cooperate to define diagonal coolant passages extending both radially and axially with respect to the rotor axis, and contoured inlet conduit means having an open intake portion disposed on the rotor periphery to pick up coolant fluid as the rotor turns and arranged to supply said fluid to said diagonal coolant passages.

2. A direct-cooled dynamoelectric machine rotor comprising a rotor body defining a plurality of circumferentially spaced axial slots, first means supplying coolant fluid to an inlet zone at the rotor periphery, second means for receiving spent coolant at an axially displaced outlet zone on the rotor periphery, a plurality of conductor strands disposed in stacked relationship in said slots, each of said conductor strands defining a longitudinal row of axially spaced pre-punched holes extending through its radial thickness, each strand also being axially displaced with respect to the overlying and underlying adjacent strands by an amount less than the axial length of said holes so as to define diagonal coolant passages extending both radially and axially with respect to said rotor body, crossover conduit means at the bottom of the rotor slots connecting adjacent holes in the lowermost conductor strands, whereby communication between two diagonal coolant passages is afforded, intake conduit means aligned with a first strand hole in the outermost conductor strand and opening into said rotor inlet zone, and discharge conduit means aligned with a second strand hole in the outermost conductor and opening into said rotor outlet zone, the first and second strand holes being axially spaced along the outermost strand so that the two diagonal flow passages initiating at the first and second holes are connected together at the bottom of the slot by said crossover conduit means, whereby coolant fluid is introduced at the rotor periphery and discharged at an axially displaced location on the rotor periphery.

3. A direct-cooled dynamoelectric machine rotor comprising a rotor body defining a plurality of circumferentially spaced axial slots, first means supplying coolant fluid at the ends of the rotor body to an axially extending chamber defined by the rotor body below one of said slots, second means for receiving spent coolant at an outlet zone on the rotor periphery, a plurality of conductor strands disposed in stacked relationship in said slots, each of said conductor strands defining first and second transversely spaced longitudinal rows of axially spaced prepunched holes extending through its radial thickness, the holes in the first row being axially displaced with respect to the holes in the second row from each strand to the next, each strand also being axially displaced with respect to the overlying and underlying adjacent strands to define first and second criss-crossed groups of diagonal coolant passages extending both radially and axially with respect to said rotor body, whereby the coolant fluid will flow radially outward in opposite axial directions from said axially extending chamber through the diagonal coolant passages to the outlet zone on the rotor periphery.

4. A direct-cooled dynamoelectric machine rotor comprising a rotor body defining a plurality of circumferentially spaced axial slots, first means supplying coolant fluid to an inlet zone on the rotor periphery, second means for receiving spent coolant at an axially displaced outlet zone on the rotor periphery, third means supplying coolant fluid at the end of the rotor body to an axially extending chamber defined by the rotor body below at least some of said slots, a plurality of conductor strands disposed in stacked relationship in said slots, each of said conductor strands defining first and second transversely spaced longitudinal rows of axially spaced holes, the holes in the first row being axially displaced with respect to the holes in the second row from each strand to the next, each strand also being axially displaced with respect to the overlying and underlying adjacent strands whereby the first row of holes in the strands define first and second parallel adjacent groups of diagonal coolant passages extending both radially and axially with respect to the rotor axis, and the second row of holes in the strands define a third group of diagonal coolant passages extending radially but in an opposite axial sense to said first and second groups of passages, crossover conduit means in the bottom of the slot connecting the first group of passages to the third group of passages, sub-slot conduit means connecting said third coolant supply means to the second group of passages, peripheral intake conduit means aligned with the first group of passages in the outermost conductor strand and opening onto said rotor inlet zone whereby coolant fluid furnished by the first supply means will flow inwardly through the first group of passages and diagonally outwardly through the third group of passages, and peripheral discharge conduit means connecting adjacent pairs of holes from the second and third group of passages and opening into said rotor outlet zone, whereby coolant fluid supplied peripherally by the first means and axially by the third means discharges from said peripheral discharge conduit means.

5. A direct-cooled winding for an electromagnetic device comprising a plurality of connected electrical conductor strands having generally rectangular cross-sections and disposed in stacked relationship, each of said conductor strands defining first and second transversely spaced longitudinal rows of axially spaced preformed holes, the holes in the first row being longitudinally displaced with respect to the holes in the second row from each strand to the next, each strand itself also being longitudinally displaced with respect to the overlying and underlying adjacent strands, whereby the first and second rows of holes in each strand together define first and second groups of diagonal coolant passages respectively extending generally in an opposite longitudinal sense along the bars, and means to introduce coolant fluid to said first and second groups of passages to cool the winding.

6. The combination according to claim 5 wherein the longitudinal strand displacement from one strand to the next is substantially one half that of the relative row displacement from one strand to the next, whereby said first and second groups of diagonal coolant passages will form substantially the same angle with respect to the strands.

7. The combination according to claim 5 wherein the axial end surfaces of the preformed first row holes are inclined in one direction with respect to the strand axis and the axial end surfaces of the preformed second row holes are also inclined but in an opposite longitudinal sense, whereby both the first and second groups of diagonal cooling passages are enlarged.

8. A direct-cooled dynamoelectric machine rotor comprising a rotor body defining a plurality of circumferentially spaced axial slots, first means supplying coolant fluid to an inlet zone at the rotor periphery, second means for receiving spent coolant at an outlet zone toward the end of the rotor body and adjacent said inlet zone, third means supplying coolant fluid from the end of the rotor body to an axially extending chamber defined by the rotor body below one of said slots, a plurality of conductor strands disposed in stacked relationship in said slots, each of said conductor strands defining first and second transversely spaced longitudinal rows of axially spaced holes, each strand being axially displaced with respect to the overlying and underlying adjacent strands whereby the first row of holes in the strands define first, second and third adjacent parallel groups of diagonal coolant passages extending both radially and axially with respect to the rotor axis, and the second row of holes in the strands define fourth and fifth groups of diagonal coolant passages extending radially but in an opposite axial sense to said first, second and third groups of passages, crossover conduit means in the bottom of the slot connecting the first group of passages to the fourth group of passages, sub-slot conduit means connecting said axially extending chamber below the slot with said second, third and fifth group of passages, peripheral intake conduit means aligned with the first group of passages in the outermost conductor strand and opening into the rotor inlet zone, first common peripheral discharge conduit means connecting adjacent pairs of holes from said second and fourth groups and opening onto said rotor outlet zone, second common peripheral discharge conduit means connecting together adjacent pairs of holes from said third and fifth groups of passages and opening from a common outlet onto said rotor outlet zone, whereby coolant fluid introduced by said first coolant supply means at the rotor periphery and said third coolant supply means will flow diagonally to cool the conductor strands in the end portion of the rotor body and discharge to the rotor periphery to be collected by said second means.

References Cited in the file of this patent

UNITED STATES PATENTS

| 1,142,009 | Blathy | June 8, 1915 |
| 2,033,058 | Williamson | Mar. 3, 1936 |
| 2,702,870 | Norris | Feb. 22, 1955 |

FOREIGN PATENTS

| 813,728 | Germany | Sept. 17, 1951 |